(12) United States Patent
Kim

(10) Patent No.: US 8,177,037 B2
(45) Date of Patent: May 15, 2012

(54) BRAKE SYSTEM

(75) Inventor: Jongsung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 320 days.

(21) Appl. No.: 12/613,451

(22) Filed: Nov. 5, 2009

(65) Prior Publication Data

US 2010/0147633 A1    Jun. 17, 2010

(30) Foreign Application Priority Data

Dec. 11, 2008 (KR) ........................ 10-2008-0125713

(51) Int. Cl.
*F16D 55/08* (2006.01)
(52) U.S. Cl. ...................................... 188/72.7; 188/72.2
(58) Field of Classification Search ........ 188/72.2–72.7, 188/156–164
See application file for complete search history.

(56) References Cited

U.S. PATENT DOCUMENTS

| 4,848,852 | A  * | 7/1989 | Inoue et al. ................. 303/155 |
| 7,721,853 | B2 * | 5/2010 | Chittka ........................ 188/72.8 |
| 7,837,014 | B2 * | 11/2010 | Schneider ................... 188/18 A |
| 2004/0154881 | A1 * | 8/2004 | Baumann et al. ............ 188/72.2 |
| 2004/0178027 | A1 * | 9/2004 | Hartsock ..................... 188/72.7 |
| 2005/0121267 | A1 * | 6/2005 | Baumann et al. ............. 188/156 |
| 2007/0045061 | A1 * | 3/2007 | Murayama ................... 188/72.2 |
| 2007/0199781 | A1 * | 8/2007 | Mackiewicz et al. ......... 188/370 |
| 2008/0164105 | A1 * | 7/2008 | Baumann et al. ............ 188/72.2 |

FOREIGN PATENT DOCUMENTS

| EP | 1 761 714 A1 | 3/2007 |
| KR | 10-0498690 B1 | 7/2005 |
| KR | 10-0610120 B1 | 8/2006 |

* cited by examiner

*Primary Examiner* — Christopher Schwartz
(74) *Attorney, Agent, or Firm* — Knobbe Martens Olson & Bear LLP

(57) ABSTRACT

A brake system of the present invention is a dual braking system, which includes an ECU that controls parts for braking when a brake pedal is operated, a main brake that is controlled by ECU by locking a wheel disc for braking in normal braking, and a sub-brake that is mounted on the wheel disc and achieves sub-braking function to achieve emergency braking for safety by locking the wheel disc by control of ECU that has detects failure of main brake. Therefore, it is possible to improve safety by achieving emergency braking while achieving F-S (Fail-Safe), when the motor of main brake fails. Further, it is possible to also achieve stable FR (Failure Rate) in an EWB or an EMB that is practically applied to a vehicle, as in a hydraulic brake system, and to expedite common use of brake systems where a BBW (Brake By Wire) technology, such as EMB and EWB, is applied.

9 Claims, 4 Drawing Sheets

BRAKE SYSTEM

CROSS-REFERENCE TO RELATED APPLICATIONS

The present application is based on, and claims priority from, Korean Application Serial Number 10-2008-0125713, filed on Dec. 11, 2008, the disclosure of which is hereby incorporated by reference herein in its entirety.

FIELD OF THE INVENTION

The present invention relates to a brake system, particularly a brake system that achieves a safe braking function using a dual brake system.

BACKGROUND OF THE INVENTION

In general, hydraulic brakes operate for braking by pressing pads against a disc using hydraulic pressure. The hydraulic brakes have complicated configurations and some limits in improving reliability of braking performance and safety. On the other hands, electromechanical brakes (EMB) have rather simple configurations and good reliability of braking performance. Thus, EMB have been increasingly used. The EMB achieves braking by directly converting the power of a motor into a straight moving force.

As an EMB using power of a motor, an EWB (Electro Wedge Brake) has been proposed, which achieves braking, using a wedge action that boosts an input force by pressing brake pads against a disc to create friction by using a wedge assembly that is operated by an actuator for braking. The EMB and EWB are generally called a BBW (Brake By Wire) technology.

However, the electromechanical brake should be operated at 12V and achieves braking using electronic signals and electric devices, such that it has a basic limit in that FR (Failure Rate) increases as compared with the hydraulic brake system.

Therefore, various methods have been developed to reduce the FR (Failure Rate) to the same level as the stable hydraulic brake system. For example, the FR (Failure Rate) is reduced by achieving F-S (Fail-Safe) by configuring a control logic that controls the EWB or EMB and a circuit reflecting it; however, this method is not provided with a device that mechanically generates a braking force when a motor, which is a power source, fails. Accordingly, the safety is deteriorated and the method gives a cause that makes it difficult to practically apply to vehicles due to the reduction of safety.

SUMMARY OF THE INVENTION

Embodiments of the present invention help overcome the drawbacks in the related art and achieve stable FR (Failure Rate) in an EWB or an EMB that is practically applied to a vehicle, as in a hydraulic brake system, by generating an emergency braking force for safety while achieving F-S (Fail-Safe) using a specific EWB or EMB type brake system, when a motor fails, in addition to brake a vehicle by creating wedge action using motor power or applying the EWB or EMB generating a straight moving force.

Further, since a specific brake system added together with EWB or EMB type brake system of the present invention provides only an emergency braking force for safety, installation is not required for all of the front and rear wheels, such that it is another object of the present invention to minimize the weight and price by applying small and thin pads as compared with a main braking structure.

Embodiments of the present invention help expedite common use by satisfying legal requirements for BBW (Brake By Wire) brake systems, by further providing an emergency brake system, even if an EWB or EMB type brake system is practically applied to a vehicle.

According to embodiments of the present invention, a brake system having a safe braking function, includes an ECU, a main brake, and a sub-brake. The ECU detects operation of a brake pedal using a sensor and controls braking. The main brake includes a caliper having a pad pressing a wheel disc, and generates output torque for holding the wheel disc using a motor that is driven by control of the ECU. The sub-brake includes a caliper having a pad pressing the wheel disc at a predetermined position from the main brake, and presses the pad toward the wheel disc for braking a vehicle in response to a control signal generated by the ECU that has detected failure of the main brake.

The main brake, which is an EWB (Electro Wedge Brake) type, includes a motor, a main wedge, and a caliper. The motor is controlled by the ECU and has a converting unit that converts rotation into a straight motion. The main wedge is composed of a roller and moving/fixed plates to increase input for pressing the wheel disc, by using the straight motion provided by the motor. The caliper covers the wheel disc and has inner/outer pads pressing the wheel disc while the main wedge moves.

Further, the sub-brake includes a caliper, a solenoid, and a sub-wedge. The caliper covers the wheel disc and has inner/outer pads. The solenoid is turned on/off by control of the ECU and has a rod that is drawn out to apply load. The sub-wedge is composed of a moving plate where load is applied by a solenoid rod, and fixed plate fixed to the caliper, and a roller disposed between wedge surfaces engraved on the moving/fixed plates to achieve a wedge action in addition to pressing the pad toward the wheel disc while being pushed by load applied from the solenoid rod.

Further, the solenoid is disposed at a predetermined position to push a side of the sub-wedge and fixed by the caliper. Further, the caliper further includes left/right stoppers at predetermined positions from both sides of the sub-wedge. Further, left/right extending ends protrude from both sides of the moving plate to accommodate the fixed plate at a predetermined gap and the left extending end directly receives the load applied by the rod of the solenoid. Further, the angles of the wedge surfaces are in a range of a coefficient of friction>tan(angle of wedge surfaces). Further, the sub-wedge further includes a return spring that is elastically supported by the caliper.

On the other hand, the sub-brake includes a caliper, a sub-wedge, a compression spring, and a solenoid. The caliper covers the wheel disc, has inner/outer pads and left/right stoppers at predetermined positions from a sub-wedge. The sub-wedge is composed of a moving plate pushed together with the pad pushed in the rotational direction of the wheel disc while restraining the wheel disc, a fixed plate fixed to the caliper, and a roller disposed between wedge surfaces engraved on the moving/fixed plates. The compression spring has one end fixed to the moving plate and the other end continuously applying load to a wedge frame fixed to the moving plate to move together with the moving plate. The solenoid has a solenoid rod restraining the wedge frame and restrains/releases the wedge frame while being turned on/off by control of the ECU.

Further, the solenoid is disposed at a side of the sub-wedge. Further, the solenoid further includes a tensile spring that applies load to the solenoid rod. According to the present invention, by practically applying an EWB or EMB type brake system to a vehicle and further providing a specific brake system that performs emergency braking for safety while achieving F-S (Fail-Safe) when a motor that is a power source fails, it is possible to also achieve stable FR (Failure Rate) in an EWB or EMB practically applied to a vehicle, as in a hydraulic brake system, and to expedite common use by satisfying legal requirements for BBW (Brake By Wire) brake system.

Further, since the BBW (Brake By Wire) brake system where the EWB or EMB type of the present invention is applied uses a specific brake system that provides only an emergency braking force, it is possible to selectively install it to the front wheel or the rear wheel, and to minimize the weight and price by applying small and thin pads as compared with a main braking structure.

BRIEF DESCRIPTION OF THE DRAWINGS

For better understanding of the nature and objects of the present invention, reference should be made to the following detailed description with the accompanying drawings, in which.

DETAILED DESCRIPTION OF PREFERRED EMBODIMENTS

Embodiments of the invention are described hereafter in detail with reference to the accompanying drawings and the embodiments are examples and can be achieved in various ways by those skilled in the art, and the present invention is not limited to the embodiments described herein.

Figure 1:
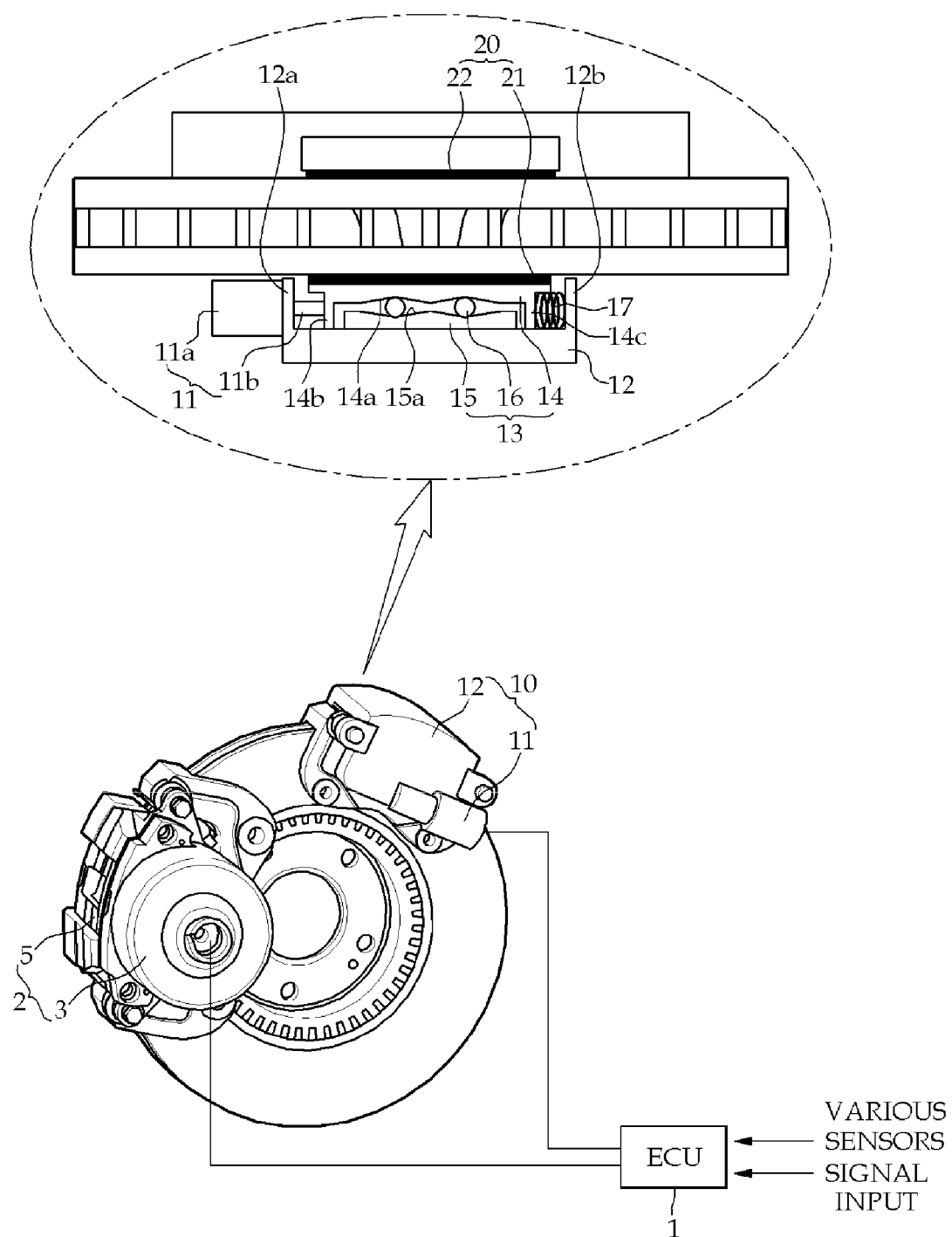
FIG. 1 is a view illustrating the configuration of a brake system having a safe braking function according to an embodiment of the present invention.

FIG. 1 is a view illustrating the configuration of a brake system having a safe braking function according to the present invention, in which the brake system of the present invention includes an ECU 1 that controls parts for braking when a brake pedal is operated, a main brake 2 that is controlled by ECU 1 by locking a wheel disc for braking in normal braking, and a sub-brake 10 that is mounted on the wheel disc and achieves sub-braking function to achieve emergency braking for safety by locking the wheel disc by control of ECU 1 that has detects failure of main brake 2.

Main brake 2 according to this embodiment, which is an EWB (Electro Wedge Brake), achieves braking by a wedge operation, which boosts the input, by pressing brake pads against the disc to create friction using a wedge assembly that is generally operated by an actuator.

Further, the EWB type main brake is not used, but an EMB (Electro Mechanical Brake), which is an electric brake device, can be used as a main brake in the present invention, and the EMB presses a wheel disc by converting the power of a motor into an axial moving force using a screw.

The EWB (Electro Wedge Brake) or EMB (Electro Mechanical Brake) are commonly called a BBW (Brake By Wire) technology and the EWB is exemplified as main brake 2 in this embodiment.

Main brake 2 generally includes a motor 3 that is controlled by ECU 1 and has a converting unit that changes rotation into a straight motion, a main wedge 4 that boost the input pressing the wheel disc by using the straight motion provided by driving motor 3, and a caliper 5 covering the wheel disc and having inner/outer pads 21, 22 that press the wheel disc, as main wedge 4 moves.

Further, main brake 2 is provided with an NSL (Non-self Locking) type screw structure and solenoid, for wear correction for maintaining a predetermined gap from pads 22, 23 to the wheel disc, for achieving F-S (Fail-Safe) due to failure of motor 3 or malfunction of main wedge 4, and for achieving an EPB (Electric Parking Brake) function that is an electronic parking brake, which is a common configuration of the EWB type brake device.

Main wedge 4 is composed of a fixed plate 4b that is fixed to caliper 5 and a moving plate 4a that faces fixed plate 4b with a roller 4c therebetween and moves straight with respect to fixed plate by a straight moving force converted by driving motor 3.

A self-energizing action using the wedge action generated by main wedge 4 having the above structure is well known in brakes in the related art, in which as moving plate 4a moves straight with respect to fixed plate 4b, roller 4c disposed in a groove between fixed and moving plates 4b, 4a moves, such that moving plate 4a presses the pads toward the wheel disc while moving away from fixed plate 4b, thereby generating an addition input force.

Figure 2:
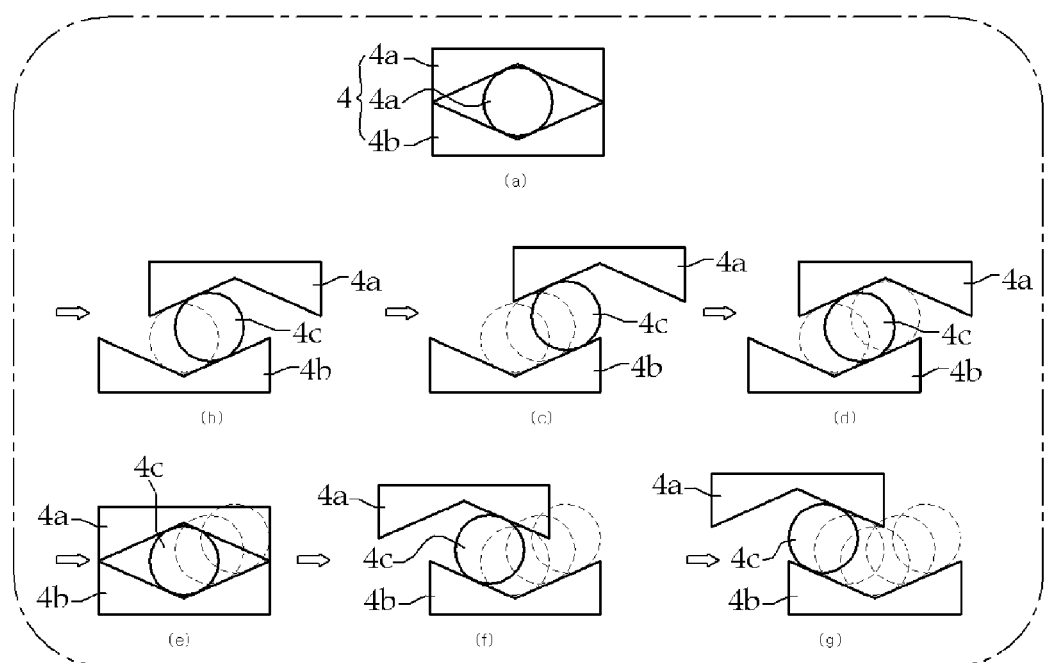
FIG. 2 is a view illustrating a braking operation of an EWB type main brake according to an embodiment of the present invention.
Figure 2:
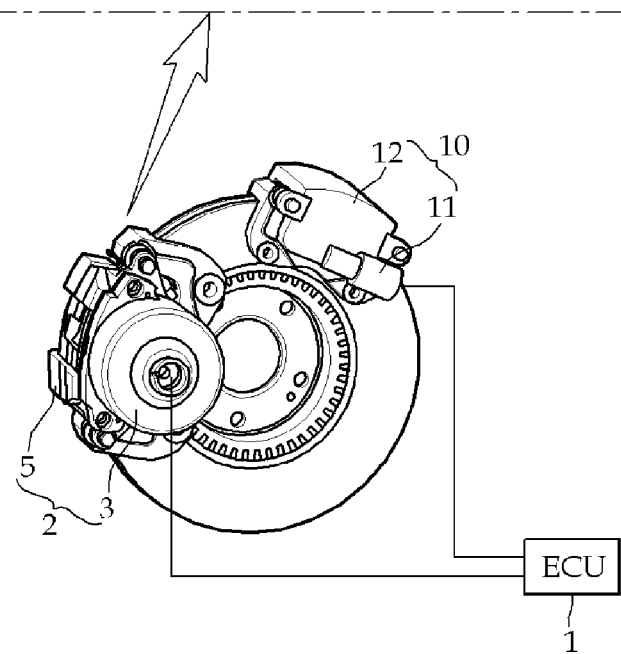

According to the operation of main brake 2, for example, as ECU 1 rotates motor 2, as shown in FIG. 2, main wedge 4 operates to generate the wedge action in order to press the pads toward the wheel disc.

That is, as the rotation of motor is converted into straight motion by a screw assembly of a shaft and a nut, such as a cable pulling-force converting unit, roller 4c moves while moving plate 4a of main wedge 4 moves, such that the wedge action is generated by continuous forward motion of moving plate 4a shown in FIGS. 2A to 2C.

Next, in un-braking, moving plate 4a is returned to the initial position by reverse rotation of motor 3 as shown in FIGS. 2D and 2E. In rearward-braking of a vehicle, as shown in FIGS. 2F and 2G, moving plate 4a moves opposite to the forward-braking and generates the same wedge action.

As the same as main brake 2, a sub-brake 10 that is independently driven by ECU 1 when motor 3 of main brake 2 fails is provided with a sub-wedge 13 for wedge action.

That is, sub-brake 10, as shown in FIG. 1, includes a caliper 12 covering the wheel disc and having inner/outer pads 21, 22, a braking operation unit 11 having a solenoid 11a that is turned on/off by control of ECU 1, and sub-wedge 13 that generates the wedge action by pressing pad 20 toward the wheel disc while moving by solenoid 11a.

For this configuration, braking operation unit 11 includes solenoid 11a having a rod 11b that is drawn to apply load, when the braking operation unit 11 is turned on by ECU 1 detecting failure of motor 3 of main brake 2.

In this configuration, solenoid 11a is disposed such that rod 11b pushes the side of sub-wedge 13, and fixed by caliper 12.

Further, caliper 12 is further provided with left/right stoppers 12a, 12b, which restrict movement distance of sub-wedge 13 at predetermined positions from both sides of sub-wedge 13.

That is, left/right stopper 12a, 12b are provided to prevent excessive movement of sub-wedge 13 that moves forward/backward in forward- or backward-braking and the gaps are determined according to the magnitude of a braking force required for sub-brake 10.

However, left/right stoppers 12a, 12b may not be made by using solenoid 11a, which can be achieved by setting the drawn length of rod 11b pushing sub-wedge 13 while being drawn out from solenoid 11a to a predetermined value, that is, setting the length of rod 11b according to the movement distance for stable operation of sub-wedge 13.

Further, sub-wedge 13 is composed of a fixed plate 15 fixed to caliper 5 and a moving plate 14 that faces fixed plate 15 with a roller 16 therebetween and moves straight with respect to fixed plate by a straight moving force applied by solenoid 11a.

In addition, sub-wedge 13 is further provided with a return spring 17 elastically supported by caliper 12 and return spring 17 help moving plate 14 return to the initial position when solenoid 11a is turned off.

Further, left/right extending ends 14b, 14c protrude from both sides of moving plate 14 to accommodate fixed plate 15 with predetermined gaps. Left extending end 14b is pressed by rod 11b of solenoid 11a, whereas right extending end 14c elastically supports return spring 17 together with caliper 12.

Further, wedge surfaces 14a, 15a, which are grooves formed on moving/fixed plates 14, 15 such that roller 16 is stably placed, have geometric shapes for stably creating a braking force, which is for preventing an excessive braking force caused by wheel jamming that occurs when friction force control of roller 16 with respect to wedge surfaces 14a, 15a is insufficient, as a braking force is applied by the friction force, which is an input force generated on roller 16.

This is for preventing the friction angle of roller 16 due to the operation of sub-wedge 13 from being larger than the wedge angle, and for this purpose, the angle of wedge surfaces 14a, 15a is determined within a range of a coefficient of friction>tan (angle of wedge surfaces).

Therefore, ECU 1 provides an emergency braking force using the wedge action of sub-wedge 13, when sub-brake 10 detects operation, that is, ECU 1 detects failure of motor 3 of main brake 2 or a problem in power supply to main brake 2 and it is difficult to normally brake a vehicle using main brake 2, such that it is possible to move the vehicle to a safe area.

Figure 3:
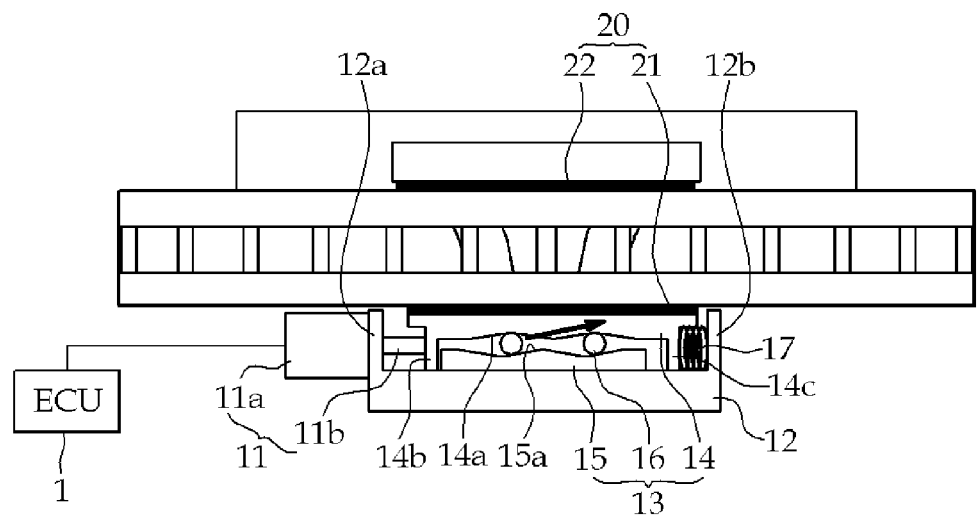
FIG. 3 is a view illustrating a safe braking operation of an EWB type sub-brake when the main brake according to an embodiment of the present invention fails.
Figure 4:
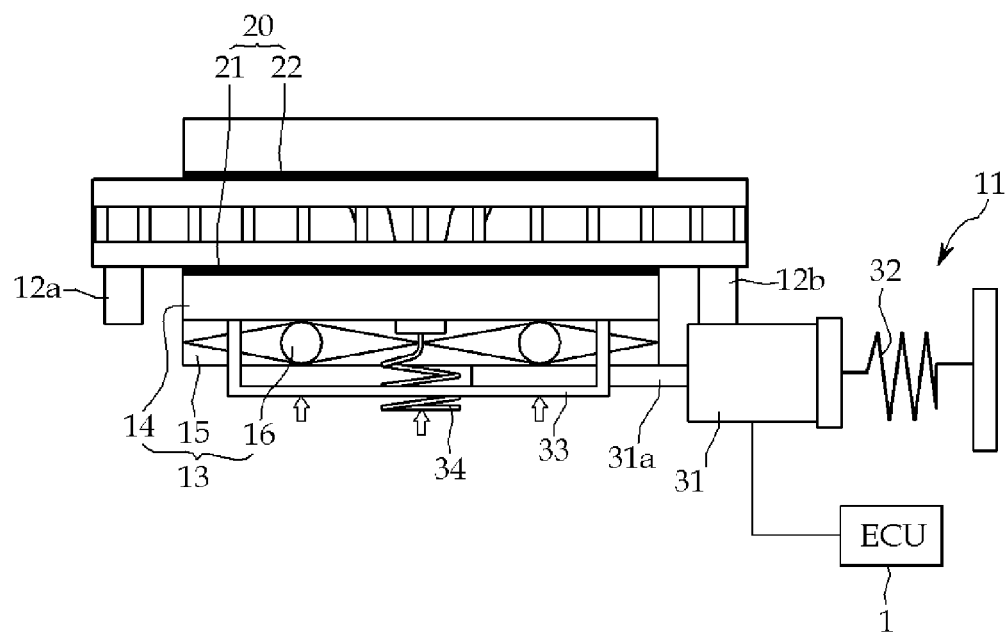
FIG. 4 is a view illustrating the configuration of an EWB type sub-braking system according to another embodiment.

In this operation, as ECU 1 turns on solenoid 11a, as shown in FIG. 3, rod 11b of solenoid 11a is drawn out and pushes sub-wedge 13, and roller 16 is moved by sub-wedge 13 pushed, thereby generating the wedge action that presses inner pad 21 against the wheel disc.

That is, as moving plate 14 is pushed by load applied from solenoid 11a while compressing return spring 17, roller 16 disposed between wedge surfaces 14a, 15a of moving plate 14 and fixed plate 15 moves while creating friction.

As described above, when roller 16 moves, moving plate 14 is pushed and moved away from fixed plate 15, such that moving plate 14 presses inner pad 21 against the wheel disc, thereby creating a braking force while restraining the wheel disc.

The self-energizing wedge action of sub-wedge 13 is achieved in the same way as that described in relation to main brake 2, and a driver can drive a vehicle while stably controlling the vehicle by the action of sub-wedge 13, even if there is a problem in main brake 2.

On the other hand, sub-wedge 10 of the present invention can accomplish the operation of sub-wedge in various ways, and for example, it may be configured to use a pressing force of a spring for the operation of sub-wedge 13.

That is, in the structure of sub-wedge 13 composed of moving plate 14, fixed plate 15, and roller 16 disposed between wedge surfaces 14a, 15a, load of a compression spring 34 pressing moving plate 14 toward wheel disc is applied to moving plate 14 and the pressing fore of compression spring 34 is transmitted only when main brake 2 fails by a solenoid 31 that is turned on/off.

For this operation, one end of compression spring 34 is fixed to moving plate 14 and the other end is fixed to a wedge frame 33 that is fixed to moving plate 14 and move together with moving plate 14, such that the load applied by compression spring 34 can push moving plate 14 toward the wheel disc through wedge frame 33.

Further, solenoid 31 is disposed at a side of sub-wedge 13 such that a solenoid rod 31a is inserted in wedge frame 33, such that as solenoid rod 31a blocks wedge frame 33 when solenoid 31 is turned on or off, it is possible to prevent movement of wedge frame 33 where load is continuously applied from compression spring 34.

Further, solenoid 31 is further provided with a tensile spring 32 and tensile spring 32 pushes solenoid rod 31a toward sub-wedge 13 while solenoid 31 returns after operating.

Further, a caliper 12 is further provided with left/right stoppers 12a, 12b, which restrict movement distance of sub-wedge 13 at predetermined positions from both sides of sub-wedge 13.

As described above, the method of using compression spring 34 also provides an emergency braking force using the wedge action of sub-wedge 13, that is, when ECU 1 detects failure of motor 3 of main brake 2 or a problem in power supply to main brake 2 and turns on or off solenoid 31, sub-wedge restrained by solenoid rod 31a is released and operates.

Figure 5:
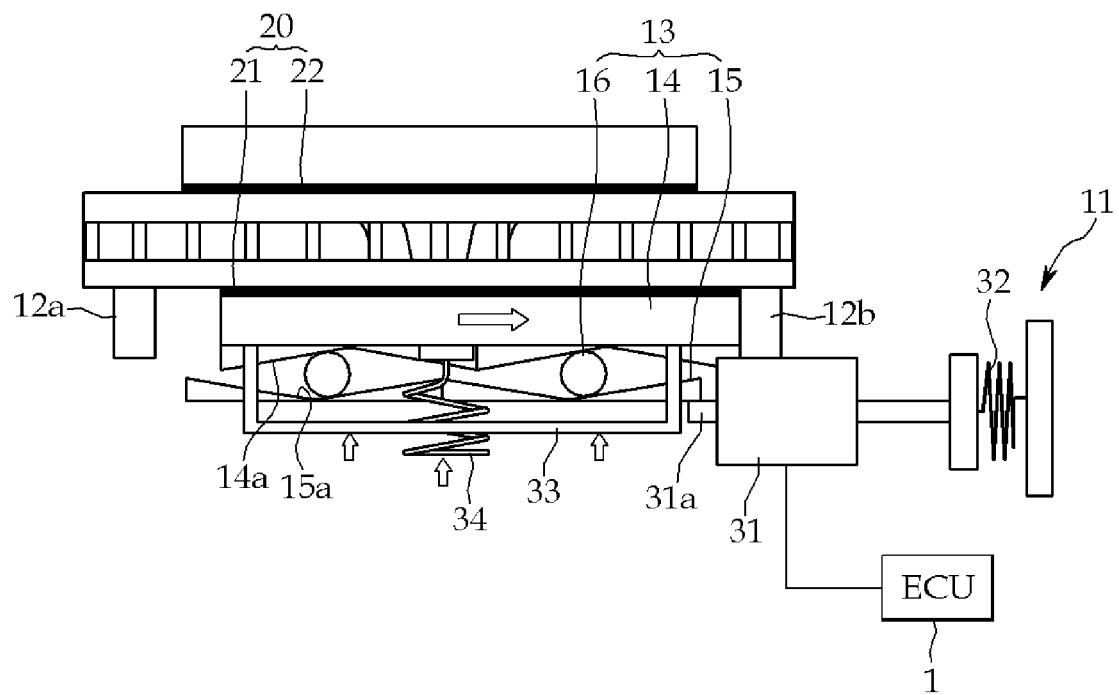
FIG. 5 is a view illustrating the safe braking operation of the EWB type sub-brake shown in FIG. 4, when a main brake fails.

That is, as shown in FIG. 5, sub-wedge 13 released from solenoid rod 31a is pushed by the load applied by compression spring 34, and accordingly, compression spring 34 pushes wedge frame 33 and wedge frame 33 pushes moving plate 14, such that inner pad 21 is pushed toward the wheel disc.

In contact with the wheel disc as described above, inner pad 21 is pushed in the rotational direction of the wheel disc by a reaction force of the wheel disc, that is, the rotation of the wheel disc, and moving plate 14 is moved in the same direction by inner pad 21 pushed.

As moving plate 14 is pushed as described above, roller 16 disposed between wedge surfaces 14a, 15a of moving plate 14 and fixed plate 15 moves while creating friction, such that moving plate 14 moves away from fixed plate 15 and inner pad 21 further presses the wheel disc, thereby generating a braking force for stopping the vehicle.

As a pressing force is applied to wedge frame 33 by the load of compression spring 34, a driver can drives the vehicle while safely controlling the vehicle even if there is a problem in main brake 2, by pressing inner pad 21 toward wheel disc and generating a braking force using the wedge action even though a specific input is not applied to sub-wedge 13.

What is claimed is:
1. A brake system comprising:
an electronic control unit (ECU) configured to detect operation of a brake pedal using a sensor and further configured to control braking;

a main brake comprising a main caliper which comprises at least one main pad configured to selectively contact a wheel disc, and the main brake being configured to generate a force for holding the wheel disc using a motor that is driven by control of the ECU;
a sub-brake comprising a sub-caliper, a solenoid and a sub-wedge, the sub-caliper comprising at least one sub-pad configured to selectively contact the wheel disc at a predetermined position distanced from the at least one main pad, and the sub-brake configured to brake a vehicle in response to a control signal generated by the ECU upon detection of a failure of the main brake;
the sub-caliper partly covering the wheel disc, wherein the at least one sub-pad comprises an inner pad and an outer pad;
the solenoid configured to be turned on or off by control of the ECU and comprising a rod that is configured to move to apply a solenoid force to the sub-wedge; and
the sub-wedge comprising:
a movable plate to which the load from the solenoid is applied,
a fixed plate fixed to the sub-caliper,
a roller disposed between wedge surfaces of the movable and fixed plates to achieve a wedge action, in which the solenoid force pushes the movable plate to cause the at least one sub-pad to move toward the wheel disc, and
a return spring elastically supported by the caliper.

2. The brake system as defined in claim 1, wherein the main brake is an EWB (Electro Wedge Brake) type, wherein the main brake includes:
a motor that is controlled by the ECU and has a converting unit that converts rotation into a linear motion;
a main wedge comprising a roller, a movable plate and a fixed plate configured to boost input for moving the wheel disc, by using the linear motion; and
the main caliper that partly covers the wheel disc, wherein the at least one main pad comprises an inner pad and an outer pad that are configured to press the wheel disc while the main wedge moves.

3. The brake system as defined in claim 1, wherein the solenoid is disposed at a predetermined position to push a side of the sub-wedge and fixed by the caliper.

4. The brake system as defined in claim 1, wherein the caliper further includes left and right stoppers disposed at predetermined positions and configured to stop movement of the sub-wedge.

5. The brake system as defined in claim 1, further comprising left and right extending ends which protrude from both sides of the movable plate to accommodate the fixed plate at a predetermined gap, wherein the left extending end is configured to receive the solenoid force applied by the rod of the solenoid.

6. The brake system as defined in claim 1, wherein a each of the wedge surfaces has a wedge angle, wherein coefficient of friction is greater than the tangent value of the wedge angle.

7. A brake system comprising:
an electronic control unit (ECU) configured to detect operation of a brake pedal using a sensor and further configured to control braking;
a main brake comprising a main caliper which comprises at least one main pad configured to selectively contact a wheel disc, and the main brake being configured generate a force for holding the wheel disc using a motor that is driven by control of the ECU;
a sub-brake configured to brake a vehicle in response to a control signal generated by the ECU upon detection of a failure of the main brake and comprising a sub-caliper, a sub-wedge, a compression spring and a solenoid;
the sub-caliper comprising at least one sub-pad configured to selectively contact the wheel disc at a predetermined position distanced from the at least one main pad, and the sub-brake being, the sub-caliper partly covering the wheel disc, wherein the at least one sub-pad comprises an inner pad and an outer pad, wherein the sub-caliper comprises a first stopper and a second stopper at predetermined positions distant from the sub-wedge;
the sub-wedge comprising:
a movable plate configured to move together with the at least one sub-pad in a rotational direction of the wheel disc,
a wedge frame coupled to the movable plate,
a fixed plate fixed to the sub-caliper, and
a roller disposed between wedge surfaces of the movable and fixed plates;
the compression spring configured to apply a spring force to the wedge frame to move the wedge frame together with the movable plate; and
the solenoid comprising a solenoid rod configured to restrain the movement of the wedge frame, and the solenoid being configured to selectively lock and unlock the wedge frame while being turned on and off by control of the ECU.

8. The brake system as defined in claim 7, wherein the solenoid is disposed at a side of the sub-wedge.

9. The brake system as defined in claim 7, wherein the solenoid further includes a tensile spring configured to apply load to the solenoid rod.

* * * * *